United States Patent [19]

Peters

[11] Patent Number: 5,299,664
[45] Date of Patent: Apr. 5, 1994

[54] BICYCLE BRAKE ASSEMBLY INCLUDING CRANK ARM LEVERS WHICH FUNCTION AS SECOND CLASS LEVERS

[76] Inventor: Jack Peters, 806 Eastwood Dr., Prescott, Ariz. 86303

[21] Appl. No.: 928,016

[22] Filed: Aug. 11, 1992

[51] Int. Cl.$^5$ ............................................. B62L 1/00
[52] U.S. Cl. .............................. 188/24.21; 188/24.15
[58] Field of Search ............... 188/24.11, 24.12, 24.14, 188/24.15, 24.19, 24.21

[56] References Cited

U.S. PATENT DOCUMENTS 4,290,507  9/1981  Brown .............................. 188/24.15

FOREIGN PATENT DOCUMENTS

| 536488 | 5/1922 | France | 188/24.12 |
| 882501 | 6/1943 | France | 188/24.12 |
| 929398 | 12/1947 | France | 188/24.15 |
| 240930 | 6/1946 | Switzerland | 188/24.12 |
| 1124883 | 8/1968 | United Kingdom | 188/24.21 |

Primary Examiner—Robert J. Oberleitner
Assistant Examiner—Kevin D. Rutherford
Attorney, Agent, or Firm—Pollock, Vande Sande & Priddy

[57] ABSTRACT

A caliper-type brake assembly for a bicycle, comprising at least one pair of opposed, generally complementarily configured elongate brake arm levers. Each brake arm lever supports adjacent a first end a bearing surface and adjacent a second, opposite end a braking pad to be urged against a sidewall of a wheel rim to be braked. Pivotal support means supports each brake arm lever on the bicycle adjacent the wheel rim and is disposed between the first and second ends of each brake arm lever, causing each brake arm lever to function as a first class lever. At least one pair of complementarily configured crank arm levers each has a first arm, a second arm, and a pivotal support adjacent an end of the first arm. Brake actuating devices secured adjacent the end of the second arm of each crank arm lever pivots the crank arm levers simultaneously about their pivotal support. Bearings supported on each crank arm lever intermediate its opposite ends engages the bearing surface of an associated brake arm lever causing each crank arm lever to function as a second class lever. Rotation of the crank arm levers about their pivots causes the brake actuating devices on each crank arm lever to act on the bearing surface of the associated brake arm lever to rotate the brake arm lever in a direction to urge its friction braking pad into engagement with the sidewall of the wheel rim to be braked.

19 Claims, 3 Drawing Sheets

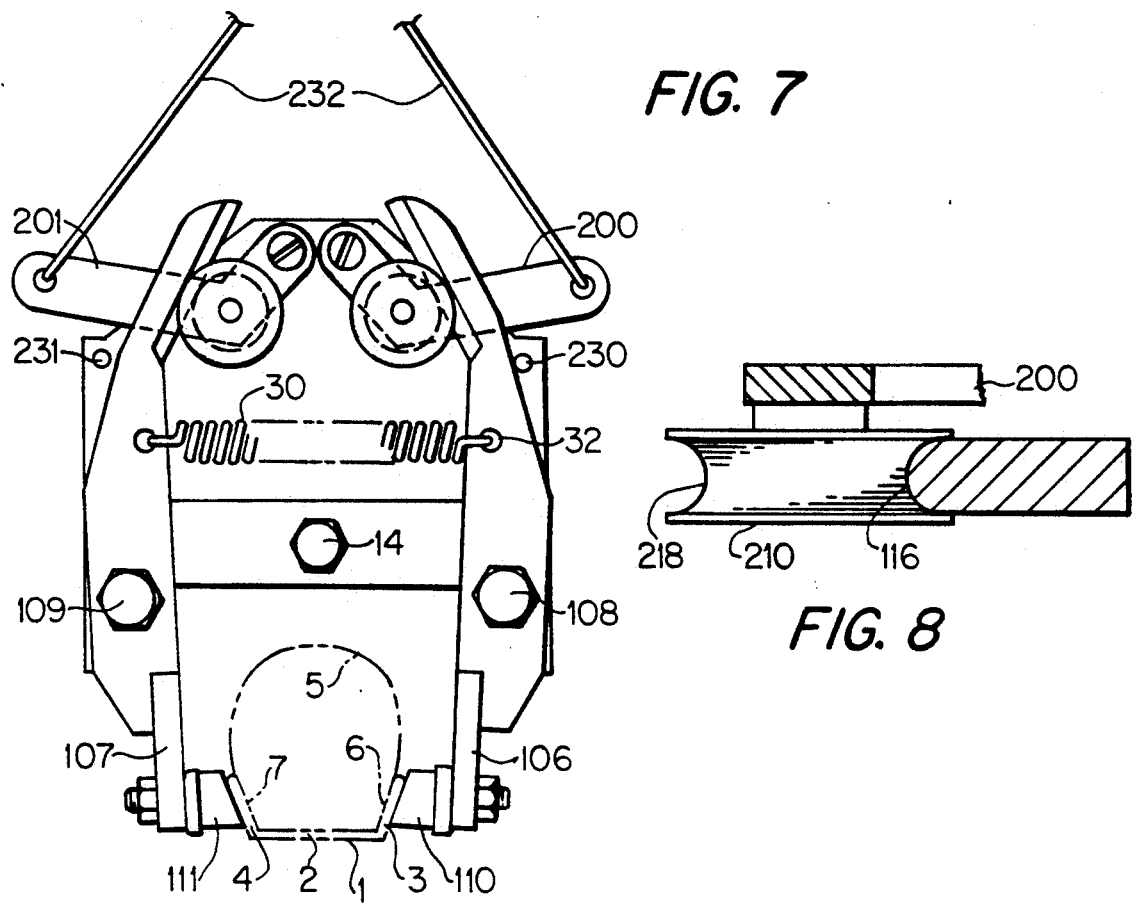
FIG. 7
FIG. 8
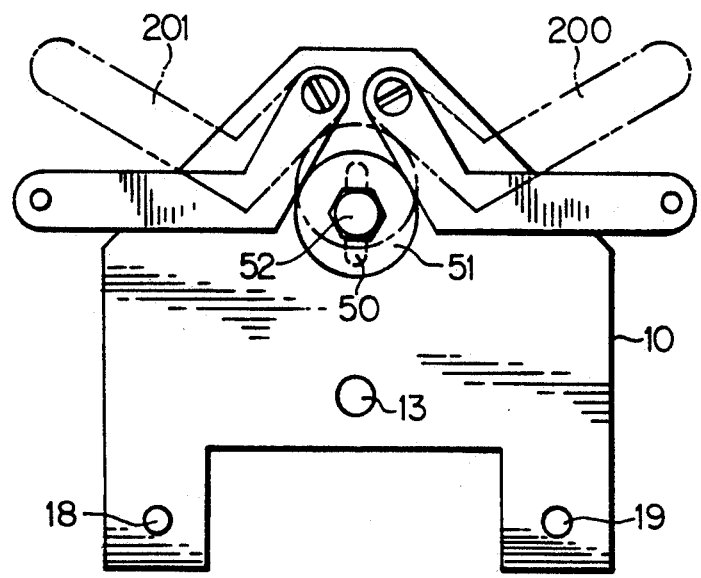
FIG. 9

BICYCLE BRAKE ASSEMBLY INCLUDING CRANK ARM LEVERS WHICH FUNCTION AS SECOND CLASS LEVERS

FIELD OF THE INVENTION

The present invention is directed to a caliper-type bicycle brake assembly.

BACKGROUND OF THE INVENTION

The most common type of hand-actuated brake assembly used with bicycles today is the caliper-type brake assembly. The present invention relates to a new design for such a type of bicycle brake. Such brake assemblies usually include a pair of arms pivotally mounted to a bicycle frame, and actuated by a cable connected to a hand lever. The arms are usually pivotally mounted on opposite sides of the front wheel and/or the back wheel. One end of each arm is generally located near the rim of each wheel and includes means for mounting a friction braking pad generally made of rubber or some similar material. The friction braking pads are each attached to the arms so as to be opposite the wheel rim.

Brakes of this type are actuated by a cable connecting the brake arms to a hand-actuated lever attached to the bicycle handle bars. The hand lever, when pulled on by the rider, applies a pulling force to the cable. The brake cable is contained within a sleeve anchored to the bicycle frame. As the cable moves in response to the motion of the hand lever, it pulls on one or both brake arms, causing them to pivot about their points of attachment. As the brake arms pivot, the friction braking pads are caused to come into contact with the wheel rim, causing the bicycle to slow due to the friction between the wheel and the friction braking pads. When the force is released from the hand lever, the cable relaxes, thereby allowing the arms of the brake assembly to reverse the direction of pivoting about their attachment points, moving the friction braking pads out of contact with the wheel rim. When the brakes are not in use, the action of one or more springs usually maintains the brake arms in an open position with the friction braking pads out of contact with the wheel rim.

Many variations on caliper-type bicycle brake assembly exist. These variations include the side-pull brake, the center-pull brake, and the cantilever-type brake. In a side-pull brake assembly, the arms of the brake assembly are pivotally mounted at a single point of attachment to the frame of the bicycle. The attachment point is generally on the top of the fork at the point where it divides into two branches between which the wheel is inserted and at the end of which the wheel is mounted.

In a cantilever-type brake assembly, the brake arms are usually attached on opposite extensions of the fork of the bicycle frame. The brake actuating cable from the hand lever usually splits into two branches at a point near the bicycle brake assembly, one of the branches being attached to one brake arm lever and the other cable attaches to the other brake arm lever. Force is applied to the cable via the hand lever, causing the brake arm levers to rotate about their points of attachment, thereby causing the friction braking pads to engage the wheel rim. Such a cantilever-type brake assembly results in a more direct and even application of power to each of the brake arms, unlike the side pull brake which depends upon a spring action for indirect application of force to the brake arm which does not have an extension to which the brake cable is attached.

In the prior art known bicycle brake assemblies discussed above, the braking power applied to the brake arm levers and consequently to the friction braking pads on the wheel rim is directly proportional to the amount of force applied to the brake cable by pulling on the hand brake lever. The more force that is applied to the brake lever, the further the cable will travel and thus more force will be applied by the friction braking pad to the wheel rim. If the rider of the bicycle wishes to stop faster or needs to apply more force in an emergency situation, he or she must simply continue to apply more and more force to the hand lever and actuating cable to achieve greater braking power. None of the known type of bicycle brake assemblies provide for any mechanical advantage in braking power other than by applying increased force to the hand-operated braking lever.

This failure to deliver adequate braking power is especially noticeable on wheel rims made of plastic. Further, the problem particularly manifests itself on "BMX" type bicycles, which not only have plastic wheel rims, but also usually only have one brake assembly. "BMX" bicycles are often used to perform stunts which frequently involve sharp, precise, and very quick stops after which the rider may pivot the bicycle on one wheel or perform another acrobatic movement with the bicycle. Such stunt movements are made quite difficult by the inability of the bicycle brake to make these pin-point stops. In part, due to the smoothness of plastic wheel rims, the interaction between the friction braking pads and the wheel rim(s) failed to provide the braking capability necessary to allow the rider to accomplish the desired movements. The present invention succeeds where known bicycle brakes fail by providing the ability to greatly magnify the force imparted by the rider to the brake cable.

SUMMARY OF THE INVENTION

It is an object of the present invention to provide a bicycle brake assembly which achieves an increase in the amount of braking force applied to the wheels of the bicycle by the brake assembly by applying principles of mechanics to alter the effective length of the brake arm levers.

It is also an object of the present invention to provide a bicycle brake assembly which achieves forceful braking by incorporating a dual lever actuation system to achieve a mechanical advantage from a first means which is then transmitted to a second lever means, which second means further mechanically increases the force received from the first lever means to deliver the braking force to the bicycle wheel.

It is a further object of the present invention to provide a bicycle brake assembly which provides variable braking power without necessarily requiring a great increase in pressure applied to the hand lever.

The present invention overcomes the problems existing in presently known bicycle brake assemblies by providing a brake which allows for the braking power to be mechanically increased by altering the effective length of the brake arm lever in response to increasing tension on the brake cable.

According to its preferred aspects, the present invention includes a caliper-type brake assembly for a bicycle or the like which is manually operable between braking and non-braking conditions including at least one pair of opposing, generally complementarily configured, pivotable, elongate brake arm levers. Each brake arm lever has adjacent a first end thereof a bearing surface extending towards the corresponding end of the opposing brake arm lever. Each brake arm lever supports a friction braking pad adjacent its second opposite end which is adapted to be urged with a controllable force against a respective sidewall of a wheel rim of the bicycle. Pivotal support means is included for each brake arm lever. A crank arm with arms of unequal length is mounted for rotation about a pivot at its shorter end. Means are included adjacent the pivot of each crank arm adapted for engaging the bearing surface of the associated brake arm. Brake actuating means secured to the other end of each crank arm allows for pivoting both said crank arms simultaneously about their respective pivots to thereby cause the means supported on each crank arm to act on the bearing surface of the associated brake arm lever to thereby rotate the brake arm lever in a direction to urge the friction braking pad into wheel braking engagement with the bicycle wheel rim. The brake assembly also includes means normally acting, in the absence of braking action, to move the friction braking pads out of engagement with the respective surfaces of the wheel rim.

BRIEF DESCRIPTION OF THE DRAWINGS

FIG. 7 shows a front view of the embodiment of the present invention bicycle brake assembly shown in FIG. 1 in a closed, engaged position.

FIG. 8 shows a cross sectional view along the line VIII of the embodiment of the present invention bicycle brake assembly shown in FIG. 1.

FIG. 9 shows another alternative embodiment of the present invention bicycle brake assembly.

DETAILED DESCRIPTION OF THE PREFERRED EMBODIMENTS

Figure 1:
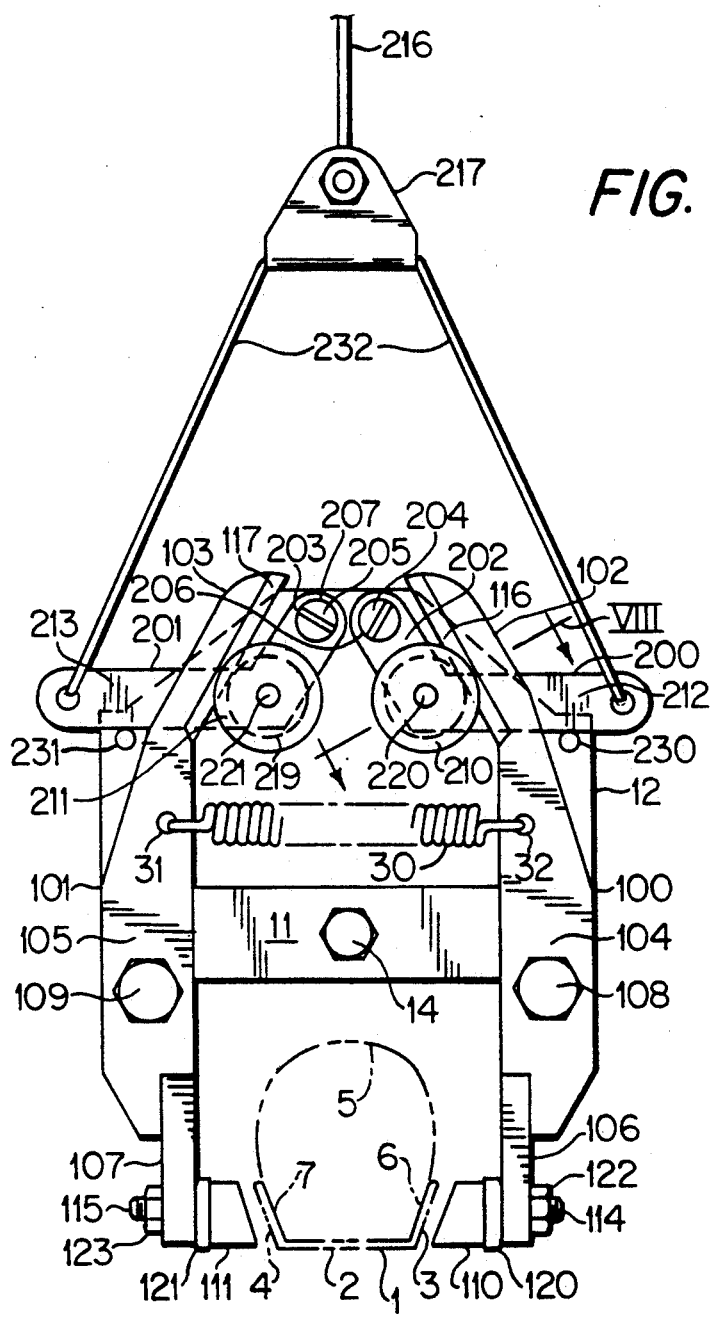
FIG. 1 shows a front view of one embodiment of the present invention bicycle brake assembly in an opened, disengaged position.

As seen in FIG. 1, the wheel rim of the bicycle wheel 1 is generally of U-shaped cross-section and supports thereon a bicycle tire 5. As seen in the embodiment shown in FIGS. 1-3, the present invention preferably may include mounting means, in this case a mounting plate 10, a pair of brake arm levers 100 and 101 are moveable between an open, disengaged position shown in FIG. 1 and a closed, engaged position shown in FIG. 7. Actuating means, including a pair of crank arm levers 200 and 201 preferably are mounted near the top of the mounting plate. Rotatably attached to each crank arm lever may be a roller bearing 210 and 211 which engages the bearing surface of the brake arm levers 100 and 101 as described below. An actuating cable 216 attached to a hand lever(not shown) mounted on the handle bars of the bicycle as seen in FIG. 1 is attached to the crank levers thereby providing means to transmit a force to the present invention bicycle brake. This force causes the brake assembly to move from an open, disengaged position to a closed, engaged position.

Figure 2:
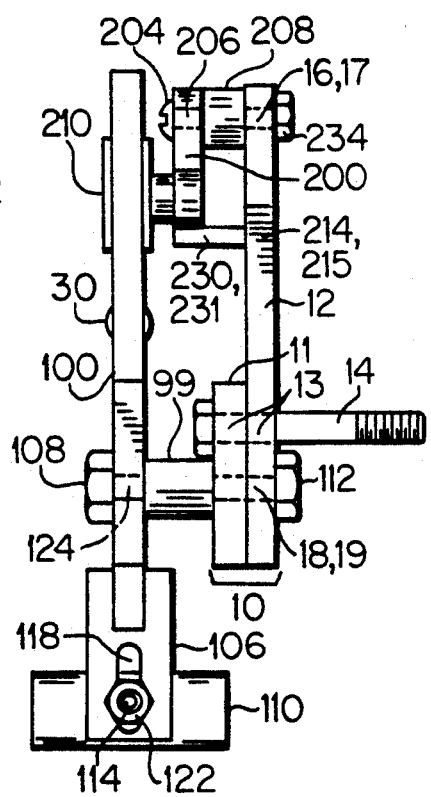
FIG. 2 shows a side view of the embodiment of the present invention bicycle brake assembly shown in FIG. 1.
Figure 3:
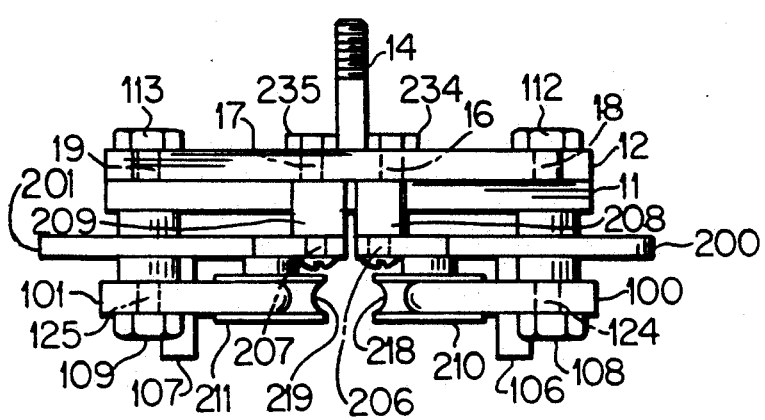
FIG. 3 shows an overhead view of the embodiment of the present invention bicycle brake assembly shown in FIG. 1.

FIG. 1 shows one embodiment of the invention. As seen in FIGS. 1 and 2, the mounting means may include a mounting plate 10. The mounting plate 10 may include a rear upright mounting plate 12 and a base mounting plate 11. In other alternative embodiments, the bicycle brake assembly may be mounted in other ways, such as, directly to the bicycle frame using optionally only one or, in some instances, no mounting plate. In the embodiment shown in FIG. 1, the upright mounting plate 12 includes a substantially rectangular mid section which may have a generally triangularly shaped upper section and two extensions extending downwardly on opposite sides of the mounting plate. However, the mounting plates may be shaped differently than as shown. The upper triangular section as seen in FIG. 2 is preferably provided with mounting holes 16 and 17 for the crank levers, mounting holes 214 and 215 for stop pins 230 and 231 to stop the crank levers, a hole 13 to attach the mounting plate to the bicycle frame, and holes 18 and 19 to attach the brake arm levers 100 and 101 to the mounting plate 10.

Attached to the lower portion of the rear upright mounting plate 12 near the base, and closest to the bicycle tire, is a base mounting plate 11 as seen in the embodiment shown in FIG. 2. The base mounting plate 11 preferably has the same structural cross-section as the lower portion of the rear upright mounting 12 plate to form a generally U-shaped element. The base mounting plate 11 is preferably attached to the rear mounting plate 12 to provide further structural strength to the mounting plate.

The base mounting plate 11 extends at least over the rear upright mounting plate 12 at the points of attachment of both the brake assembly to the bicycle frame and the brake arm levers to the mounting plate. The mounting plates may be attached to the bicycle frame using a nut(not shown) and bolt 14 as seen in FIG. 2. The bolt 14 extends through the hole in the base mounting plate 11, then through the hole 13 in the rear upright mounting plate 12, and into a hole formed in an element of the bicycle frame. Other means of attachment for the present invention bicycle brake assembly are available such as welding the mounting plate to the frame, or mounting the brake arm levers directly to the frame.

A pair of opposing, generally complementarily configured, pivotable, elongate brake arm levers 100 and 101 is preferably mounted to the bicycle frame with pivotal support means. The brake arm levers preferably may be pivotally attached, with the mounting plates in the embodiment shown in FIGS. 1-3, to the bicycle frame on opposite sides of the wheel. Therefore, the brake arm levers are preferably mounted on or near the front or rear fork.

Each brake arm lever preferably includes a first end 102, 103 supporting a bearing surface, and a second opposite end, including contact means to contact a surface of the wheel rim. A distinct central section may be included on the brake arm levers. The second end 106 and 107 of the brake arm levers 100 and 101 preferably is situated substantially opposite to the sides 3 and 4 of the wheel rim 1 so that a contact means may engage the wheel rim. The contact means preferably is a friction braking pad or friction braking pad 110 and 111 made of a resilient compound, such as rubber. The friction braking pads in the embodiment shown in FIGS. 1 and 2 are mounted to the brake arm levers using a nut and bolt. The rubber used to make up the friction braking pad preferably is mounted on a metal piece 120 and 121. Bolts 114 and 115 may be attached to the back of the metal piece and adjustably secured in a slots 118 and 119 on the brake arm levers with nuts 122 and 123. Any mounting means may be used to secure the friction braking pad to the brake ar levers.

In an opened, disengaged position, the friction braking pads are spaced from the wheel rim. In a closed, engaged position, the brake arm lever has been caused to pivot about the point of attachment, with pivotal support means, of the brake arm levers to the mounting plate or bicycle frame so that the friction braking pads come into contact with the wheel rim.

The brake arm levers 100 and 101 preferably are supported with pivotal support means at two holes 18 and 19 which are arranged toward the periphery of the lower portion of the rear upright 12 and base 11 mounting plates. The brake arm levers 100 and 101, as seen in the embodiment shown in FIGS. 1-3, preferably are mounted to the mounting plates 11 and 12 using nuts 112 and 113 and bolts 108 and 109. The bolts are inserted through mounting holes 124 and 125 formed in each brake ar lever. The mounting holes 124 and 125 preferably are positioned on the brake arm levers 100 and 101 such that they are located between the lower portion 106 of the brake arm where the friction braking pad 110 is mounted and the upper portion 102 and 103 including the angled bearing surface to thereby cause each brake arm lever to function as a first class lever. The bolts 108 and 109 may be inserted through the brake arm levers 100 and 101 and through the two mounting plates 11 and 12 and secured with a nuts 112 and 113. A spacer 99 may be placed between the brake arm lever and the base mounting plate to maintain the brake arm levers 100 and 101 in the proper position relative to the other components of the brake assembly and clear of the mounting bolt 14.

Each brake arm lever 100 and 101, as seen in FIG. 1, may include a first end 102 and 103 which is angled toward the other brake arm lever, a mid-section 104 and 105, and a second end 106 and 107 including mounting means for a wheel rim contacting means 110 and 111 situated opposite the wheel rim. The first end preferably supports a bearing surface extending towards the corresponding end of the opposing brake arm lever at an angle between 55° and 70° away from a plane perpendicular to the wheel axle and passing through the brake arm lever mounting bolts. In a preferred embodiment, the angled first end is at an angle of 62.5°.

Although the bearing surface in the embodiment shown in FIG. 1 includes a planar bearing surface, the bearing surface may be a convex bearing surface such as surfaces 116 and 117 as may be provided on the surface of the first end of the brake arm lever facing the other brake arm lever. The bearing surface alternatively may be of other convenient shapes. The bearing surfaces may be oriented to engage the complementary surface of the roller bearings as described below.

Means such as a spring 30 may be provided to normally act to connect the two brake arm levers at a point between the attachment point of the brake arm lever to the mounting plates and the angled first section. This spring maintains the brake arm levers in an opened position so that the means for contacting the wheel rim is kept out of contact and away from the wheel rim. The end of the element forming the spring preferably may be formed into a hook which can pass through the hole 31 and 32 formed in each of the brake arm levers 100 and 101. The spring 30 causes the brake arm levers 100 and 101 to pivot so that the portion of each brake arm lever above the attachment bolt moves toward the other as seen in FIG. 1.

Toward the upper end of the rear upright mounting plate 12, remote from the bicycle tire 5, there may be pivotally secured, a pair of crank arm levers 200 and 201. Each crank arm lever is preferably a substantially V shaped arm having arms of unequal length. A first, shorter end 202 and 203 of each V-shaped arm preferably includes attachment means for the crank lever to be pivotally mounted to the rear upright mounting plate. The crank levers preferably may be mounted to the mounting plate using nuts 234 and 235 and bolts 204 and 205. The bolts may be inserted in holes 206 and 207 formed in the first end of the crank arm levers and through the mounting holes 16 and 17 in the mounting plate 12.

A spacer 208 preferably is placed between each crank arm lever 200 and 201 and the mounting plate 12 to maintain the crank arm levers in their proper position relative to the brake arm levers 100 and 101. Additionally, the spacer maintains the proper clearance of the crank arm levers away from the bicycle frame and/or mounting plate 12. The crank arm levers, in the embodiment shown in FIG. 1, may be attached so that their attachment points are located between the two brake arm levers. Alternatively, the pivot may be located outside of the brake arm levers.

The crank arm levers are free to rotate about their points of attachment until encountering stop pins 230 and 231. The stop pins maintain the crank arm levers and thereby the brake arm levers in an opened position as seen in FIG. 1. In an opened position, the first segments 202 and 203 preferably should be placed at the same angle as the upper angled portion of the brake arm levers so that the first segment of the crank arm levers are parallel to the angled first section of the brake arm levers.

Also, preferably included in the brake assembly is a means to engage the bearing surface of the adjacent brake arm lever. This means includes, in the embodiment shown in FIG. 1, a roller bearing 210 and 211 adjacent the pivot of each crank arm lever. Each roller bearing as shown in the embodiment shown in FIGS. 1-3 preferably is circular in cross-section and includes a concave outer bearing surface 218 and 219. The inner upper surface 116 and 117 of each brake arm lever may include a bearing surface complementary to the bearing surface 218 and 219 found on the roller bearing. Although the embodiment shown in FIG. 1 includes a roller bearing, other devices, even a simple pin, which engage the bearing surface 116 and 117 may be included in the brake assembly.

The shape of the bearing surfaces may be varied and is not limited to the concave roller bearing and convex brake arm lever. For example, the concave and convex surfaces could be reversed, or an alternative means could be provided to cause the movement of the brake arm levers. The crank arm levers and the roller bearings are attached to the bicycle frame and/or mounting plate(s) such that the concave outer bearing surface of each roller bearing contacts the bearing surface on the first angled section of each brake arm lever.

Each roller bearing is round and may include a mounting hole 220 and 221 formed therein. As a means to aid the rotation of the roller bearings, they may include a central section in which the mounting hole is formed. Surrounding the central section ma be placed a plurality of ball bearings contained by the central section and an outer ring shaped section placed about the central section. The ball bearings allow the outer ring of the roller bearing to freely rotate. The outer surface of the outer ring shaped section of each roller bearing ma include the substantially circular concave bearing surface. Preferably, the outer edge is an arc equivalent to approximately one half of a circumference of a circle having the curvature of the concave outer edge.

Each crank arm lever preferably includes a second arm 212 and 213 of the V-shaped crank lever as seen in the embodiment shown in FIG. 1 which preferably extends away from the space between the brake arm levers and is at an obtuse angle from the other arm of the V of the crank lever. However, the V formed by the first and second arms of the crank levers may be of any desired angle.

Means to transmit a force causing the brake levers to move between an opened and a closed position preferably includes a brake actuating cable 216 and a hand-actuated lever(not shown). The brake cable 232 preferably is attached near the end of the second ends 212 and 213 of the crank levers to thereby cause each said crank arm lever to function as a second class lever. As seen in the embodiment shown in FIG. 1, one cable may connect the ends of the crank levers. This connecting cable is preferably long enough so that when pulled from a point near its middle, the cable will extend above the entire brake assembly even with the brake assembly in the open position as seen in FIG. 1. To the connecting cable preferably is attached an actuating cable 216 which is connected to a hand actuated brake lever(not shown). Connecting means 217 may be attached to the two cables as in the embodiment shown in FIG. 1.

In an alternative embodiment, the cable from the hand lever is attached to a first one of the crank levers. A clamp may be attached to the cable from the hand lever at a point so that with the brakes in either an opened or closed position, when a second cable connecting the clamp with a second crank lever is attached, the clamp connecting the two cables will lie substantially near the central axis of the brake assembly. Other cable connecting arrangements for the present invention bicycle brake assembly are possible.

Figure 4:
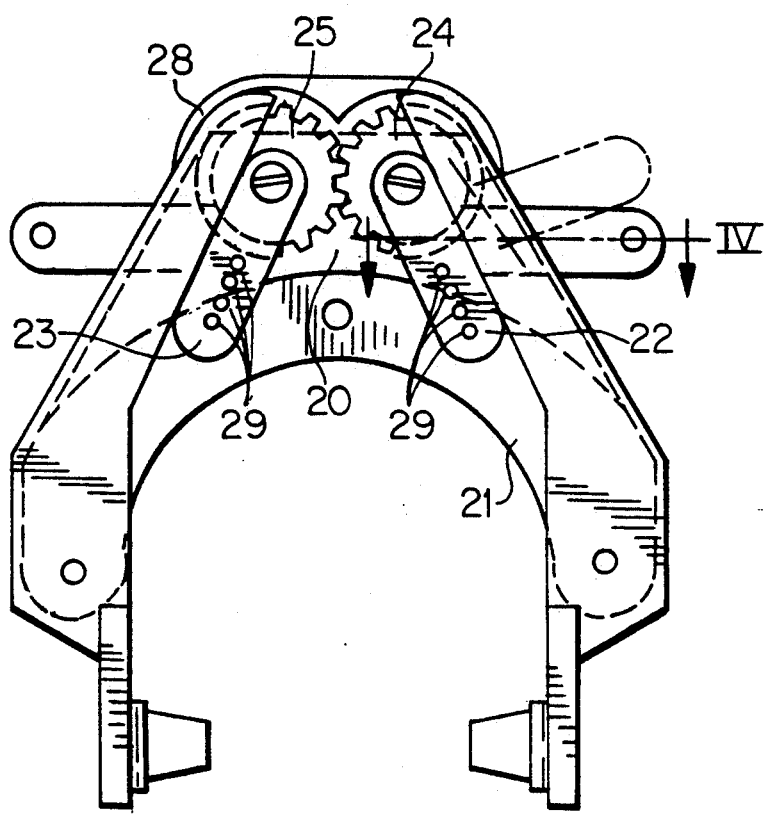
FIG. 4 shows a front view of another embodiment of the present invention bicycle brake assembly.
Figure 6:
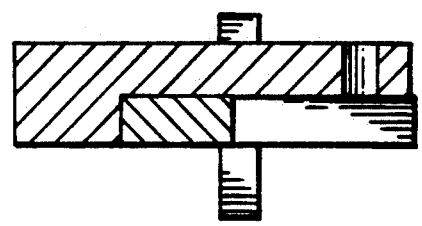
FIG. 6 shows an overhead view of the brake arm and crank arm lever of one embodiment of the present invention bicycle brake assembly.

An alternative embodiment of the present invention bicycle brake assembly shown in FIG. 4 includes an alternative mounting plate, brake arm lever, and crank lever designs. The attachment or mounting plate may include a rear upright mounting plate 20 which is substantially semi-circular in shape with an upper extension. Attached to the rear upright mounting plate 20 is a base attachment plate 21 which is substantially the same shape as the rear plate but lacks the upper extension. As in the embodiment shown in FIG. 1, the mounting plate of the embodiment shown in FIG. 4 includes mounting holes for the crank levers, a mounting hole to mount the plates to the bicycle frame, and mounting holes for the brake arm levers. The mounting plates are attached to the bicycle frame at a point permitting the arms of the semi-circle to extend at least partially about the bicycle tire as shown in FIG. 4.

The embodiment shown in FIG. 4 also includes brake arm levers substantially similar both in form and function to the brake arm levers of the embodiment shown in FIG. 1. However, the brake arm levers of the embodiment shown in FIG. 4 differ from those shown in the embodiment in FIG. 1 in that the angled first section of the brake arm levers including the bearing surface is longer than the bearing surface in the embodiment shown in FIG. 1 and constitutes a greater portion of the overall length of the brake arm lever.

In any embodiment of the present invention, the exact proportions of the brake arm lever which are made up of the midsection, the first section, including the bearing surface, and the friction braking pad mounting portion are not important. The exact cross-sectional design of the brake arm levers is not critical as long as the means for contacting the wheel rim may be mounted substantially opposite the wheel rim and the brake arm lever includes a bearing surface sufficient for the brakes to be actuated. The brake arm lever must also include a mounting hole and means for mounting a spring to maintain the brake assembly in an open position. The structure of the brake arm levers must withstand the stress placed on the brake arm lever when the brake is actuated.

In addition to the alternative mounting plate and brake arm lever designs included in the embodiment shown in FIG. 4, the embodiment also includes an alternative crank lever design. In the embodiment shown in FIG. 4, the first arm of the V of the crank arm levers, which is rotatably mounted to the mounting plate, includes leg extensions 22 and 23 which extend beyond the apex of the V of the crank lever as shown in FIG. 4.

Included on these extended first arms of the crank arm levers is means for adjustably mounting the roller bearings. The adjustable mounting means includes a series of mounting holes 29 for mounting the roller bearings. Providing the crank lever with a series of mounting holes as in the embodiment shown in FIG. 4, the roller bearing may be mounted at the optimum position for the bicycle frame and wheel combination to which the bicycle brake assembly is attached. Changing the position of the roller bearing allows the friction braking pads to be maintained at an optimum distance from the wheel rim of which may vary depending upon which bicycle the present invention assembly is attached. Additionally, changing the position of the roller bearing can allow a greater braking power to be delivered to the wheels, if it is desired. Further, as the friction braking pads wear, the optimum distance from the wheel rim may be maintained by altering the placement of the roller bearing.

Figure 5:
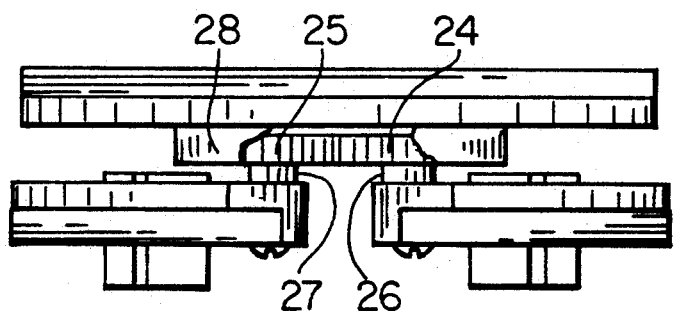
FIG. 5 shows an overhead view of the embodiment of the present invention bicycle brake assembly shown in FIG. 4.

In the embodiment shown in FIG. 4 the crank arm levers preferably are provided with spur gears 24 and 25 which may be rigidly attached to the crank lever at its pivotal end. As shown from above in FIG. 5, the spur gears are mounted so that they will rotate only with the actuation of the crank arm levers. For example, the spur gears may be rigidly mounted with the crank arms keyed rotatable bushings 26 and 27 through which the crank arm mounting bolt is inserted. The mounting bolt is then secured to the brake assembly as in the embodiment shown in FIG. 1. Alternatively, the spur gear may be attached over the surface of the crank lever at that point where the crank levers are attached to the mounting plate or the outer surface of the first arm of the crank lever may be formed in the shape of the spur gear.

Regardless of how or where the spur gears are attached to the brake assembly, if they are included in the assembly, actuation of one spur gear will cause the other spur gear and thus the other crank arm to rotate. This transfer of motion via the spur gears causes both crank arm levers to actuate in substantially the same, though opposite rotation, resulting is substantially the same pressure to be applied to the respective brake arm and thus to the friction braking pad. Additionally, use of the spur gears can result in both crank levers returning to a similar position in a non-braking condition after the rider releases the hand actuated lever. The spur gears can also reduce the occurrence of the brake assembly moving out of adjustment.

The gears as shown in FIG. 4 have the same shape, with the same number and spacing of teeth so that the crank levers will rotate at equal rates and will apply equal pressure to both brake arm levers. The gears may extend either partially or completely around the mounting point of the crank arm levers. A protective cover 28 preferably is placed over the gears to provide protection from debris or dirt which might clog the gears and to protect them from any outside forces which may damage them. The operation of the embodiment shown in FIG. 4 is substantially similar as that of the embodiment shown in FIG. 1 as described below.

Another embodiment of the present invention shown in FIG. 9 is substantially similar to the embodiment shown in FIG. 1. However, the embodiment shown in FIG. 9 includes an elongated slot 50 formed in the mounting plate, in which a bolt supporting a spacer is slidably mounted. Mounted on a bolt in a similar manner to the crank levers and the brake arm levers, the spacer may be secured by a nut attached to the bolt at any point along the slot. With the spacer in place, the crank levers may rotate only until the surface of each crank lever contacts the surface of the spacer. In this manner, the spacer serves to maintain the crank levers in a desired position when the brake is in an opened, disengaged position.

The precise stopping point of the crank levers becomes important, for instance, if the friction braking pads of the present invention wear from excessive use and wear one-half of their original thickness. In this case, the spacer could be repositioned to maintain the friction braking pads at the proper distance from the wheel rim for the quickest and safest stop. Normally, the friction braking pads will be from one sixteenth of an inch to three thirty-seconds of an inch away from the wheel rim. However, if desired, the friction braking pads may be any distance from the wheel rim.

The spacer is mounted using mounting means which preferably includes a bolt 52 which is inserted through the elongated slot 50. Between the head of the bolt and the face of the slot preferably is inserted a spacer 51. The bolt 52 may be secured to the mounting plate using a standard washer and nut. With the brakes in the open, disengaged position, the crank levers will rest on the spacer so that the means for contacting the wheel rim connected to the brake arm levers is maintained in the optimum position relative to the wheel rim for braking.

OPERATION OF THE PRESENT INVENTION

The embodiments of the present invention seen in FIG. 1, operates to provide stopping power for a bicycle in the following manner. With the brake in an opened, disengaged position as seen in FIGS. 1 and 2, the crank arm levers will rest on stop pins 230 and 231. Alternatively, as seen in FIG. 9, the crank arm levers will rest on the spacer 51. When the rider of the bicycle desires to actuate the present invention bicycle brake, the rider applies pressure to a hand brake lever attached to the handlebars of the bicycle by applying a pressure to pull the hand lever toward the handlebar. The hand lever transmits a pulling force on an end of the cable attached to the hand lever. The brake cable is mounted within a sleeve which is anchored to the bicycle frame so that the path the cable travels when pulled on will remain constant and the pulling force will be transmitted to the end of the cable. The brake actuating cable 216 seen in FIG. 1 will then apply pressure to the cable 232 pulling it in a direction away from the bicycle brake assembly.

As pressure is applied to the brake cable 232, it will apply pressure to the ends of the crank levers 200 and 201. This applied pressure will cause the crank lever 200 to rotate in a counter clockwise direction about the mounting bolt 204 and the crank lever 201 to rotate in a clockwise direction about its mounting bolt 205 as seen in FIG. 1. In an embodiment including spur gears, the rotation of either crank arm lever will cause the rotation of the other. As the crank levers rotate, they cause the roller bearings to rotate and ride along the bearing surfaces 116 and 117 on the brake arm levers. Simultaneously, the roller bearings apply force to the brake arm levers causing them to rotate about their attachment bolts 108 and 109 into a closed, engaged position, causing the means for contacting the wheel rim 110 and 111 to come into contact with the surfaces of the wheel rim 3 and 4.

As the crank levers rotate about their points of attachment, causing the roller bearings to apply force to the brake arm levers, the roller bearings rotate up the surface of the bearing surface on the brake arm levers, away from the point of attachment of the brake arm levers. As each roller bearing moves along the surface of the brake arm lever, the point of contact of the roller bearing with the brake arm lever moves away from the point of attachment of the brake arm lever to the mounting plate, into the closed, engaged position of the bicycle brake assembly as seen in FIG. 7. The operation of the brake assembly in this manner takes advantage of a simple mechanical principal that the further out along a lever a force is applied, the greater the force that is applied to a fixed point on the opposite side of the fulcrum from the applied force.

Additionally, due to the position of the contact point of the roller bearing with the brake arm lever so far from the fulcrum, the present invention, prior to the movement of the roller bearing on the brake arm lever, includes a magnification of the pulling force from the brake cable. The braking power of the present invention is increased even further because the present invention includes a two lever system in which the brake arm levers are actuated by the crank arm levers. This double-lever actuation system results in a mechanical advantage from the crank arm levers, which is then transmitted and magnified by the brake arm levers. As compared to the prior art, known bicycle brakes, the present invention causes an increase in braking power without requiring the rider to greatly increase the force applied to the hand lever.

When braking action is no longer required by the rider, the rider will relax his or her grip on the hand lever, allowing the spring 30 to pull the brake arm levers back into an opened, disengaged position. As the brake arm levers rotate due to the action of the spring, they cause the crank arm levers to rotate back into an opened position until they rest on either the stop pins or the spacer. Alternatively, tension from the brake cable may be used to prevent the components of the brake assembly from rotating too far. The brake cable tension, spacer, or stop pins should be adjusted so that in an opened position, the friction braking pads will be maintained at the proper distance from the wheel rim.

I claim:

1. A caliper-type brake assembly for a bicycle, comprising:
    at least one pair of opposed, generally complementarily configured elongate brake arm levers;
    each said brake arm lever supporting adjacent a first end thereof a bearing surface;
    each said brake arm lever supporting adjacent a second opposite end a friction braking pad adapted to be urged with a controllable force against a respective sidewall of the wheel rim to be braked;
    pivotal support means for each said brake arm lever for supporting the brake arm lever on said bicycle adjacent a respective wheel rim to be braked, each said pivotal support means being disposed between said first and second ends of the respective brake arm lever to thereby cause each said brake arm lever to function as a first class lever;
    at least one pair of complementarily configured crank arm levers each having a first arm and a second arm and a pivotal support means adjacent an end of said first arm;
    brake actuating means secured adjacent the end of said second arm of each said crank arm lever for pivoting said crank arm levers simultaneously about their respective pivotal support means;
    means supported on each said crank arm lever intermediate its opposite ends for engaging said bearing surface of an associated brake arm lever to thereby cause each said crank arm lever to function as a second class lever;
    whereby rotation of said crank arm levers about their respective pivots causes said brake actuating means on each said crank arm lever to act on the bearing surface of the associated brake arm lever to thereby rotate said brake arm lever in a direction to urge its associated friction braking pad into wheel braking engagement with the respective sidewall of the wheel rim to be braked.

2. The bicycle brake assembly according to claim 1, wherein said shorter arm of each said crank lever arm is substantially parallel to said bearing surface on said associated brake arm lever.

3. The caliper-type brake assembly according to claim 2, wherein said first arm and said second arm of each said crank arm lever are of unequal length.

4. The caliper-type brake assembly according to claim 3, wherein said first arm of each said crank arm lever is shorter than said second arm.

5. The caliper-type brake assembly according to claim 4, wherein said first arm and said second arm of each said crank arm lever form an angle therebetween.

6. The caliper-type brake assembly according to claim 5, wherein said angle is between 55° and 70°.

7. The caliper-type brake assembly according to claim 6, wherein said angle is 62.5°.

8. The caliper-type brake assembly according to claim 1 further comprising means normally acting, in an absence of braking action, to rotate said brake arm levers to move the respective friction braking pads out of wheel-braking engagement with the respective sidewall of the wheel rim to be braked.

9. The caliper-type brake assembly according to claim 1, wherein said bearing surface on each said brake arm lever extends towards the corresponding end of said opposing brake arm lever.

10. The brake assembly according to claim 1, wherein each said brake arm lever is supported by said pivotal support means at a point closer to said second end than to said first end.

11. The brake assembly according to claim 1, wherein said pivotal support means for each said crank arm lever is mounted between said brake arm levers.

12. The brake assembly according to claim 1, wherein said engaging means on each said crank arm lever includes a roller bearing mounted for rotation about its center, each said roller bearing rollingly engaging said bearing surface on the associated brake arm lever as said brake assembly moves between braking and non-braking conditions.

13. The brake assembly according to claim 1, wherein said brake actuating means includes at least one cable connected between each said second end of each said crank arm lever and a hand-actuated lever.

14. The brake assembly according to claim 1, wherein said bearing surface is non-planar.

15. The brake assembly according to claim 1, wherein each said bearing surface of each said brake arm lever is a planar surface angled toward the opposing brake arm lever at about 62.5° from a line parallel to the major axis of the brake assembly.

16. The bicycle brake assembly according to claim 1, wherein a spur gear is mounted for rotation about the crank arm lever pivot, each spur gear having a plurality of teeth engaging teeth on the other spur gear, each said spur gear and crank arm lever mounted about the same pivot not rotating relative to each other.

17. The brake assembly according to claim 1, wherein said brake assembly includes means to stop rotation of said crank arm levers as said brake assembly moves from a braking to a non-braking position.

18. The bicycle brake assembly according to claim 17, wherein said means to stop rotation includes spacer means slidably mounted between said crank arm levers.

19. The bicycle brake assembly according to claim 1, wherein said shorter end of each said crank arm lever includes an extension having a least two positions for supporting said means for engaging said bearing surface.

* * * * *